Patented Apr. 25, 1939

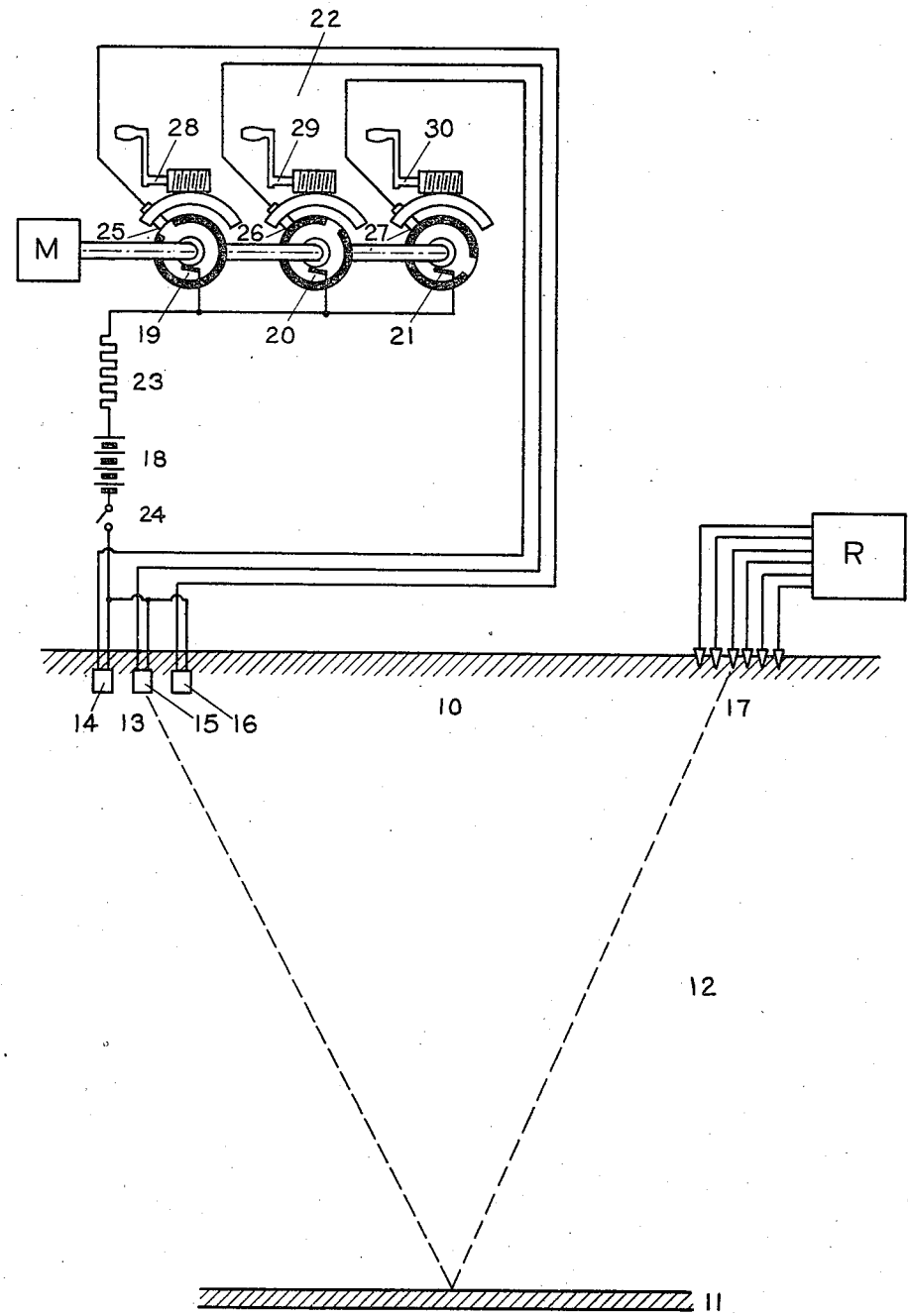

2,156,198

UNITED STATES PATENT OFFICE 2,156,198

METHOD FOR SEISMIC PROSPECTING

Serge Alexander Scherbatskoy, Tulsa, Okla., assignor to Engineering Laboratories, Inc., Tulsa, Okla., a corporation of Oklahoma Application February 15, 1937, Serial No. 125,851

3 Claims. (Cl. 181—0.5)

This invention has to do primarily with improvements in methods of setting up seismic disturbances at selected points within the crust of the earth for various purposes.

The invention is particularly applicable to the methods of prospecting the subsurface structure of the earth by means of seismic waves. In the practice of these methods it is customary to generate elastic wave at a given location and to record the resulting vibrations at another location so that the nature of the intervening sections of the earth's crust between the two locations may be studied from the records formed. Therefore in all the variations of this method, one finds a source of shock which sends out elastic waves, and several seismographs disposed over the ground which receive the waves.

The method now used in practice consists in firing a charge of a very violent explosive. Part of the waves originated by the explosion reach the seismograph after having travelled only near the surface. These direct waves are of little interest to the geophysicists and an effort is made to eliminate these waves from the records. Another part of the waves penetrate into the underground and strike a subsurface formation which possesses physical characteristics such that the velocity of the wave propagation through it is different. Consequently such a subsurface formation may reflect, refract, and diffract the aforesaid wave trains and change the direction of their travel and return them to the surface of the earth.

One of the methods of seismic prospecting makes use of the reflected waves. Thus in order to determine the structure of a subsurface formation one measures the time necessary for a seismic wave produced by a superficial explosion to travel downwards and to return to the surface of the earth after reflection from the subsurface formation.

In the study of the seismic waves paths particular attention should be given to the uppermost layer of the earth (usually about 20–100 feet deep) consisting of an unconsolidated stratum disintegrated by various atmospheric and biological agents and usually designated as the "weathered zone". Experience has shown that the waves travelling in the weathered zone are comparatively much more intense than the waves penetrating into the deeper formations and the large amplitude registrations which the waves travelling in the weathered layer may record on the seismogram frequently hide or obscure the desired reflected waves. Consequently the record of the earth motion may fail to produce satisfactory data unless special provisions are made to accentuate the waves that are to be reflected and to reduce the strength of the waves that travel horizontally in the weathered zone. This can be done by increasing the efficiency of the explosion downwards, and reducing the efficiency of explosion for the waves travelling horizontally in the weathered layer.

It is therefore an object of the present invention to provide a method of generating seismic waves in which the efficiency of the energy transmission downwards is increased.

It is a further object of the present invention to provide a method of generating seismic waves in which the efficiency of the energy transmission horizontally in the weathered zone is decreased. It is a further object of the present invention to provide a method for generating seismic waves in which certain frequencies favorable to the energy transmission in the desired direction are emphasized.

Further purposes appear in the specification and in the claims.

In my method I am taking into account a factor which has been entirely neglected in the prior art and which consists in shaping the imparted seismic wave so as to increase its effect in the downward direction. It is well known by those skilled in the art that the imparted seismic wave can be represented in the form of a Fourier integral and may be considered as a continuous spectrum of frequencies distributed according to a predetermined law. It is also well known by those skilled in the art that certain wave frequencies transmit themselves more easily through the consolidated subsurface and constitute the predominant components of the spectrum of the reflected waves which return from the deeper subsurface formations, while other wave frequencies transmit themselves more easily through the weathered layer and constitute the predominant components in the spectrum of the waves travelling through the weathered layer. Thus experience has shown that in reflected waves the frequency in the range of 30 to 60 cycles per second carry the most energy while the privileged components of the waves travelling in the weathered layer are usually below 30 cycles per second.

In order therefore to increase the efficiency of the energy transmission in the downward direction one must favor the frequencies around 50 cycles to the detriment of the lower frequencies of oscillation. Thus optimum conditions can be attained by providing a seismic wave possessing a frequency spectrum in which the components in the neighborhood of 50 cycles per second will be emphasized and the components corresponding to the lower frequencies reduced in intensity.

I accomplish the above-mentioned results by using in place of a single explosive charge a plurality of explosive charges placed in substantially the same location and arranged to be subsequently detonated at predetermined time intervals.

The number of such charges may be adjusted to meet particular circumstances but I prefer to use two or three such charges.

For the satisfactory operation of my method it is important that the instants at which the various charges are detonated should be properly spaced in time. The reason for this is that I have found it efficient to produce a seismic wave the composition of which is closely grouped about a definite frequency, the said frequency depending upon the length of the time intervals separating the successive deonations. It is apparent that if I wish to emphasize the frequency component corresponding to 50 cycles per second it is most efficient to produce several detonations succeeding each other at the time intervals of 1/50th of a second.

It is therefore obvious that the novelty of my invention does not reside in increasing the energy imparted to the earth, but in improving the frequency spectrum of the produced seismic wave, in order to increase the amount of energy transmitted downwards to the detriment of the energy transmitted horizontally through the weathered zone.

This and other features of my invention will become more apparent by consideration of a detailed description in conjunction with the accompanying drawing which forms a part of the specification and which shows in diagrammatic fashion one preferred embodiment of my invention.

Referring now more particularly to the drawing, the numeral 10 designates the thin weathered surface of the earth, 11 a hard consolidated stratum and 12 the intervening formations. A source of seismic waves is located at 13. This source may consist of a certain number of buried charges of dynamite as those designated by 14, 15, 16, which will set up seismic waves when exploded, or it may be other means such as adapted to produce impacts directly upon the surface of the earth. The seismic waves originate at point 13 and are transmitted in all directions through the surrounding geological formation. Part of the waves are received by geophones located at 17. The geophones translate the earth vibrations into corresponding electrical currents which in turn are transmitted to the recording instrument R and impress themselves upon the photographic strip of paper.

The explosive charges 14, 15, 16 are adapted to be energized successively from the the battery 18 through the sections 19, 20 and 21 of a distributor 22 and current limiting resistor 23. The sections 19, 20, and 21 of the distributor are driven by the shaft of the motor M. Each of the sections is provided with an insulating ring (indicated in black on the figure) which forms part of its periphery. Thus an electrical connection between the battery 18 and each of the brushes 25, 26, and 27 can occur only during a short time interval when the insulating ring is not in contact with the respective brush. The brushes 25, 26, and 27 are stationary but their position may be adjusted by means of gear and worm 28, 29, and 30.

In explaining the operation of the above described apparatus it will be assumed that the rotating distributor sections 19, 20, and 21 are in the position indicated in the drawing, and that the direction of rotation is counter-clockwise. It is also assumed that the switch 24 is closed. Under these conditions the brush 25 is in contact with the segment 19 thereby energizing the corresponding circuit and causing the detonation of the dynamite charge 16. At the same instant the brushes 26 and 27 are insulated from the distributors 20 and 21 by means of insulated rings and consequently the circuits capable of supplying energy to the dynamite charges 14, 15 are inoperative. The distributor segments 19, 20, 21 being rotated by the motor M cause an instant later the brush 26 to be in contact with the segment 20 thereby energizing the corresponding circuit and causing detonation of the dynamite charge 15. After a further time interval during the rotation of the shaft of the motor M the brush 27 becomes placed in contact with the segment 21 thereby energizing the corresponding circuit and causing the detonation of the dynamite charge 14.

It is therefore apparent that I have provided means for successive explosion of the dynamite charges 14, 15, and 16 the said exposions occurring one after another at predetermined time intervals. I have been able to control the time intervals between the detonations by selecting an appropriate speed for the shaft of the motor M and determining individually the position of the stationary brushes 25, 26, and 27 by means of gear and worms 28, 29, and 30. By selecting appropriate values of the time intervals at which the successive detonations occur I have been able to produce seismic waves in which certain predetermined frequency components are emphasized.

I am aware that the successive firing of several charges has been used heretofore in seismic prospecting but in the prior art these charges have not been placed at the same location but have been arranged in a vertical or a horizontal alignment for various purposes entirely different from those of the present invention and the wave produced has not been of the type which is obtained in the practice of my invention.

In view of my invention and disclosure, variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. The seismic reflection method in which the waves reflected from a geologic horizon are used to determine the contour of the said horizon, comprising determining the frequency characterizing waves reflected from the said horizon, arranging a plurality of explosive charges substantially at the same point below the earth's surface, and detonating said charges successively with a frequency substantially equal to the said frequency characterizing the reflected waves.

2. A method according to claim 1 in which at most three of said explosive charges are used.

3. The method of generating elastic waves in the earth for geophysical prospecting purposes which comprises successively detonating a plurality of explosive charges at substantially the same point and at a frequency substantially equal to the frequency of the earth waves that will be most efficiently transmitted through the earth at the location being prospeced.

SERGE A. SCHERBATSKOY.